United States Patent

Brams et al.

[11] Patent Number: 5,577,839
[45] Date of Patent: Nov. 26, 1996

[54] DEVICE FOR CHARGING INJECTION MOLDING AND EXTRUDING MACHINES AND HAVING A FUNNEL PROVIDED WITH PINS PASSING THROUGH CLEARANCES IN A FEED WORM

[75] Inventors: Peter Brams, München; Franz Ell, Schwabhausen; Werner Mandl, Unterzeitlbach, all of Germany

[73] Assignee: Krauss Maffei Aktiengesellschaft, Munich, Germany

[21] Appl. No.: 490,240

[22] Filed: Jun. 14, 1995

[30] Foreign Application Priority Data

Jun. 16, 1994 [DE] Germany .................... 44 21 117.1

[51] Int. Cl.⁶ .................................................. B29B 7/60
[52] U.S. Cl. ................. 366/76.3; 366/158.3; 425/582; 425/587
[58] Field of Search ................... 366/35, 38, 41, 366/76.3, 76.4, 76.9, 78, 76.93, 90, 91, 155.1, 156.1, 156.2, 158.2, 158.3, 303, 307, 322, 324; 425/205, 449, 582, 587

[56] References Cited

U.S. PATENT DOCUMENTS

| | | | |
|---|---|---|---|
| 2,799,047 | 7/1957 | Widiger et al. | 366/76.9 |
| 3,327,348 | 6/1967 | Roehlig et al. | 366/76.9 |
| 3,632,255 | 1/1972 | Geyer | 425/205 |
| 3,981,658 | 9/1976 | Briggs | 425/205 |
| 4,117,548 | 9/1978 | Craig . | |
| 4,199,263 | 4/1980 | Menges et al. | 366/307 X |
| 4,249,877 | 2/1981 | Machen | 366/76.9 |
| 4,416,543 | 11/1983 | Brinkmann | 366/91 X |
| 4,581,992 | 4/1986 | Koch | 366/90 X |
| 5,259,749 | 11/1993 | Meixner et al. | 425/582 X |

FOREIGN PATENT DOCUMENTS

| | | | |
|---|---|---|---|
| 1301959 | 7/1962 | France | 366/76 |
| 137813 | 4/1901 | Germany . | |
| 1003947 | 3/1957 | Germany . | |
| 1529803 | 1/1970 | Germany . | |
| 3712828 | 11/1988 | Germany . | |
| 4024994 | 2/1992 | Germany . | |
| 57-89939 | 6/1982 | Japan | 366/76 |
| 59-192542 | 10/1984 | Japan | 366/76 |
| 397517 | 4/1991 | Japan | 425/587 |
| 679754 | 3/1994 | Japan | 425/582 |
| 1199631 | 12/1985 | U.S.S.R. | 366/90 |

*Primary Examiner*—Charles E. Cooley
*Attorney, Agent, or Firm*—Herbert Dubno

[57] ABSTRACT

The problem of insufficient friction along the wall of a rotating funnel feeding viscous material to an extruder or injection molding machine so that the material sweeps past the conveying screw and prevents the conveying screw from continuously feeding that mass to the outlet of the funnel, is solved by providing pins which project inwardly from the rotating funnel wall and engage in interruptions in the flight of the conveying screw. The funnel wall can also be provided with pockets or grooves.

8 Claims, 2 Drawing Sheets

DEVICE FOR CHARGING INJECTION MOLDING AND EXTRUDING MACHINES AND HAVING A FUNNEL PROVIDED WITH PINS PASSING THROUGH CLEARANCES IN A FEED WORM

FIELD OF THE INVENTION

The present invention relates to a device for charging with a plastifiable or plastic mass, generally a viscous mass or a mass of flowable powder or comminuted materials or mixtures thereof, injection molding machines and extruders. More particularly, the invention relates to an apparatus for charging injection molding and extruder units having a feedworm in the case of an extruder or a piston feed chamber in the case of an injection molding machine, with viscous materials, especially glass-fiber charged plastics, e.g. polyesters and polypropylene, utilizing a filling funnel and a worm which lies along an inner wall of that funnel and is rotatable so that its flight will advance the flowable mass from the wide mouth of the funnel toward the narrow outlet communicating with the extruder or injection molder chamber.

BACKGROUND OF THE INVENTION

An apparatus of the type described is illustrated, for example, in the commonly owned German Patent 37 12 828 and German Open Application DE-OS 40 24 994 A1. In both of these systems, a funnel is provided which can be rotated about the axis of the frustocone, which axis forms an acute angle with the axis of the conveyor screw lying along the wall of the funnel and forcing the mass into a passage communicating with an injection molding machine or extruder unit.

In terms of prior art, mention can also be made of German Patent Document 137 813 which describes a meat chopper having a worm whose flight is interrupted to cooperate with pins projecting toward the worm in the regions of such interruption. The interaction of the worm and the pins serves to comminute the meat. A screw vent is described in U.S. Pat. No. 4,117,548 which has a pin extending into a region in which a flight is interrupted and in German Published Application DE-AS 1 003 947, the cross section of an extruder worm is serrated or fluted to promote the shearing action. Finally, mention may be made of DE-AS 1 529 803 which provides a pocket in the worm chamber of an extruder also to cooperate with the worm in the advance of the flowable mass therealong.

However, in systems of the type described in German Patent DE 37 12 828 and DE-OS 40 24 994, in which the wall of the frustoconical funnel is relatively smooth and, as is customary, may be chromium coated to reduce wear, with long operating intervals with materials which are relatively abrasive, for example, recycled plastics, fillers, glass fibers, ceramics and the like, the materials processed additionally smooth and polish the inner surface so that it tends to lose all of its original surface roughness.

As a consequence, material can slip past the feeder conveyor so that the conveyor, while continuously operating, does not continuously feed the mass and hence the output of the apparatus is reduced.

When an attempt was made to solve this problem by providing worms or screws with teeth, the improvement was minimal.

OBJECTS OF THE INVENTION

It is the principal object of the present invention to provide an improved apparatus of the type described, i.e. a feeder for an injection molding machine or extruder which will increase the feeding rate to the apparatus and reliably insure continuity of feed of the material introduced into the funnel.

Another object of this invention is to provide a device or apparatus, i.e. a feeder for an injection molding machine or extruder, which will overcome the drawbacks of earlier devices for this purpose.

SUMMARY OF THE INVENTION

These objects and others which will become more readily apparent hereinafter are attained, in accordance with the invention by providing the inner surface of the frustoconical rotating funnel with at least one formation, i.e. projections and/or recesses, and to provide the worm or screw with a recess or cutout to allow free passage of the projections on the rotating frustoconical funnel wall.

The feeder of the invention is intended for a shaping machine for a viscous mass, i.e. an injection molding machine or an extruder, and can thus comprise:

- a frustoconical filling funnel rotatable about an axis and having a wide mouth at one end and a narrow outlet at an opposite end communicating with the receiving chamber of the shaping machine;
- a rotatable conveyor screw extending along an inner wall of the funnel parallel to a generatrix thereof and formed with a screw flight for displacing the viscous plastic mass toward the outlet; and
- at least one formation on the inner wall forming a discontinuity in a rectilinear path therealong between the mouth and the outlet and in a region of the flight, the screw being provided with a recess to clear any portion of the formation projecting toward the screw upon rotation of the formation with the funnel past the screw.

The feeder supplies a metering worm in the case of an extruder or a piston prechamber in the case of a piston type injection-molding machine with a viscous material, especially a glass fiber charged plastic like a polyester or polypropylene.

With the apparatus, relatively thick, high filler sheet molding compound (SMC) can be processed and in the case of bulk molding (BMC) masses, the feed rate can be doubled or the time in which a given amount of material is supplied to the extruder or injection molding machine through a given apparatus can be reduced by half.

Thermoplastic scrap materials and recycled plastics can also be processed without difficulty with the apparatus of the present invention with a high degree of reliability. The apparatus has also been found to be effective with thermoset resins, for example, phenolic resins and to be effective with rubber scrap, for example, scrap tires.

According to a feature of the invention, the formations include at least one pin projecting inwardly from the inner wall and a multiplicity of such pins, the recess in the conveyor screw being an interruption in the worm flight for clearing the pin.

When a multiplicity of pins are provided, they are provided in one or more rows along the inner wall. Means can be provided for adjusting the height to which the pin extends in the funnel. Furthermore, the discontinuities in the wall can include pockets or grooves formed therein.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
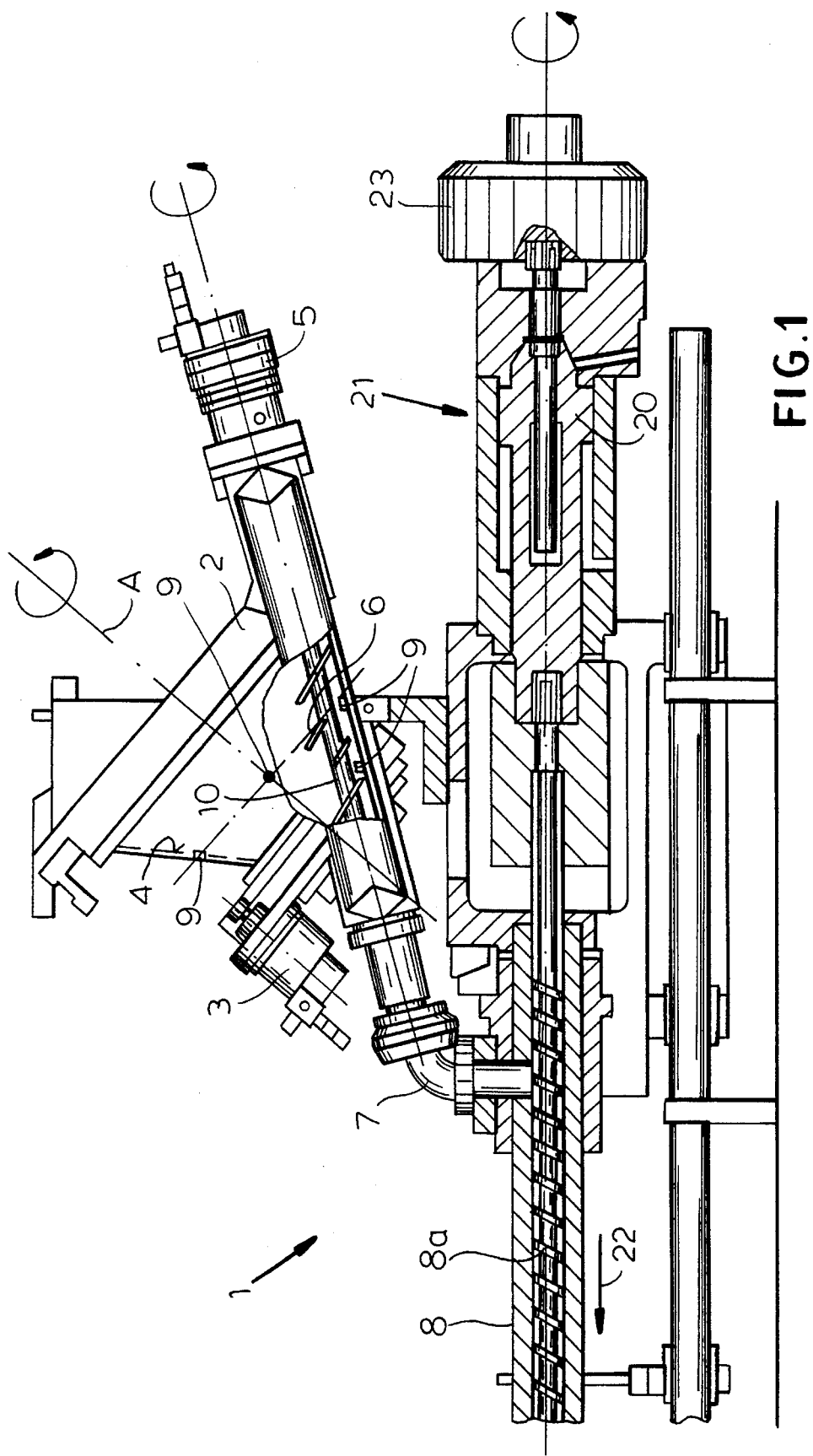
FIG. 1 is a diagrammatic side elevational view of the apparatus of the invention filling a combined extruder and injection molding machine.

FIG. 1 shows an extruder 8 forming part of an injection molding machine 21 whose piston 20 can displace the worm 8a of the extruder in the direction of the arrow 22. The worm 8a is the feed worm for the plastifying portion of the extruder which communicates with an injection molding mold in the usual manner. The piston 20 can be driven by a motor 23 to rotate the worm or screw 8a in the usual manner.

Above the machine 8, 21, a filling funnel 2 is provided, the funnel being rotated by a drive 3 about an axis A inclined at an acute angle to the axis of the screw 8. Along a generatrix of the inner wall 4 of the funnel 2 a conveyor worm or screw 6 is driven by a motor 5 and extends through the funnel from its wide mouth to its narrow outlet end, feeding the mass to an outlet connected by a pipe section 7 in the form of an elbow to the metering screw 8a of the extruder.

Figure 2:
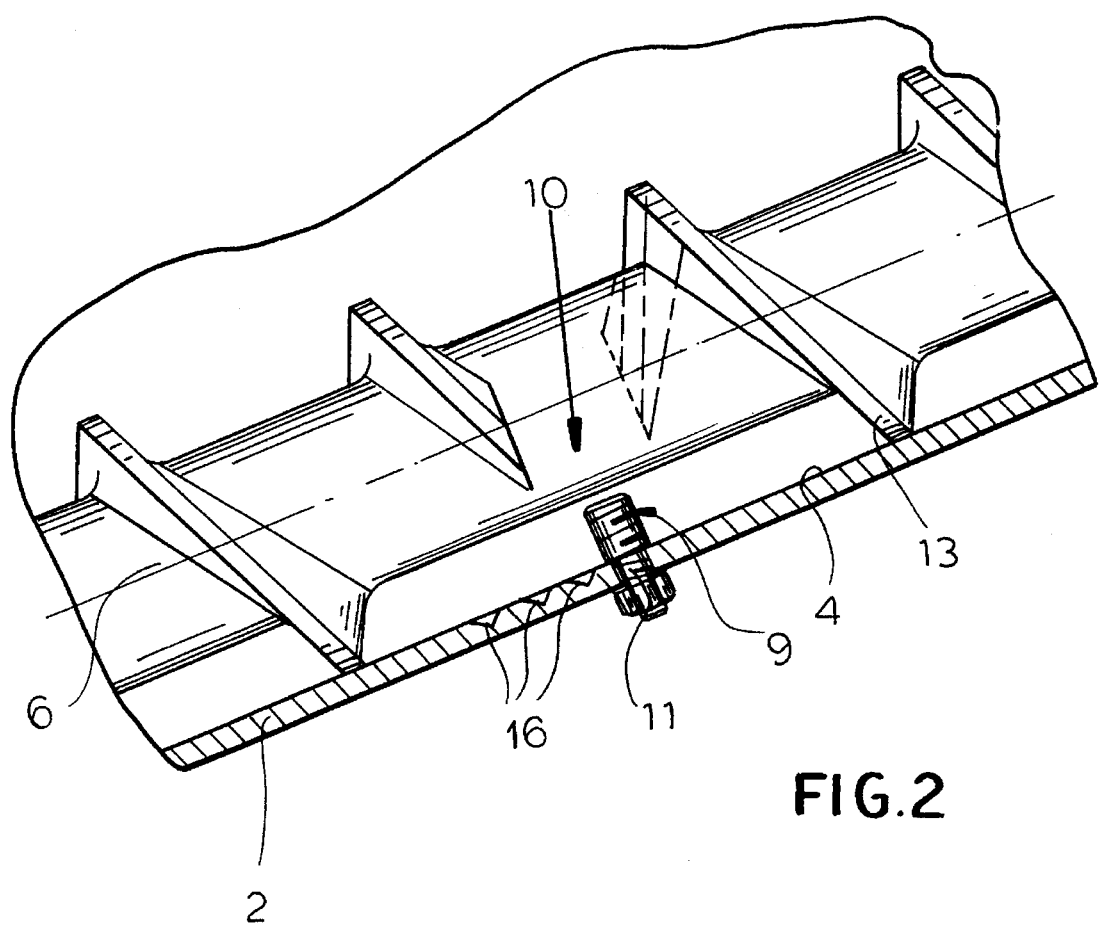
FIG. 2 is a detail in cross section showing the region of the conveyor screw and a pin in the wall of the funnel.

The inner surface 4 of the funnel is provided with two rows of pins 9 which project inwardly from the inner wall 2 and sweep through recesses 10 formed in the screw 6 as interruptions of the flight. FIG. 2 shows that the pin 9 has a screwthread 11 which is clamped by the nut 12 to the funnel 2. The screw can be adjusted in the funnel wall and locked by the nut 12.

Figure 3:
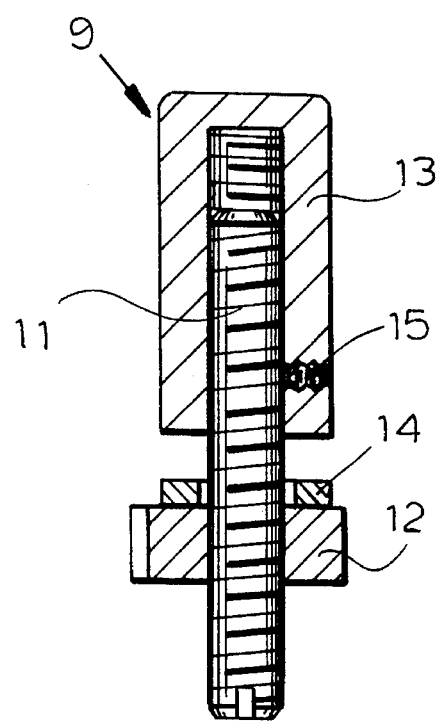
FIG. 3 is a cross sectional view through a pin illustrating the adjustability.

In the embodiment of FIG. 3, the pin 9 is formed with a sleeve 13 threaded onto the screw 11 which can be threaded into the wall of the funnel and locked by the nut 12 and the lock washer 14, the sleeve 13 being adjusted on the screw 11 and held in place by a set screw 15.

The inner wall 4 of the funnel is provided not only with the pins 9 previously described but also with grooves or pockets 16 which likewise form discontinuities in the rectilinear path along the wall of the funnel from its wide mouth to its narrow inlet.

We claim:

1. A feeder for a shaping machine for a viscous plastic mass, said shaping machine having a chamber receiving said mass, said feeder comprising:

a frustoconical filling funnel rotatable about an axis and having a wide mouth at one end and a narrow outlet at an opposite end communicating with said chamber;

a rotatable conveyor screw extending along an inner wall of said funnel parallel to a generatrix thereof and formed with a screw flight for displacing said viscous plastic mass toward said outlet; and a plurality of inwardly projecting pins on said inner wall forming discontinuities in rectilinear paths therealong between said mouth and said outlet and in a region of said flight, said screw being provided with an interruption in said flight to clear said pins upon rotation of said pins with said funnel past said screw.

2. The feeder defined in claim 1 wherein said machine is an injection-molding machine and said chamber is provided to feed an injection-molding piston.

3. The feeder defined in claim 1 wherein said machine is an extruder and said chamber is provided with at least one extruder screw.

4. The feeder defined in claim 1 wherein said pins are provided in one or more rows along said inner wall.

5. The feeder defined in claim 4, further comprising means for adjusting a height to which each of said pins extends in said funnel.

6. The feeder defined in claim 4 wherein said inner wall of said funnel is provided with at least one pocket.

7. A feeder for an injection molding or extrusion machine having a chamber for receiving a viscous plastic mass, said feeder comprising:

a frustoconical filling funnel rotatable about an axis of the funnel and having a wide mouth at one end and a narrow outlet at an opposite end communicating with said chamber;

a rotatable conveyor screw extending along an inner wall of said funnel parallel to a generatrix thereof and formed with a screw flight for displacing said viscous plastic mass toward said outlet; and a pin projecting inwardly on said inner wall and forming a discontinuity in a rectilinear path of said mass along said inner wall between said mouth and said outlet and passing said conveyor screw in a region of said flight, said screw being provided with a recess clearing said pin as said pin is rotated with said funnel past said screw.

8. A feeder for an injection molding or extrusion machine having a chamber for receiving a viscous plastic mass, said feeder comprising:

a frustoconical filling funnel rotatable about an axis of the funnel and having a wide mouth at one end and a narrow outlet at an opposite end communicating with said chamber;

a rotatable conveyor screw extending along an inner wall of said funnel parallel to a generatrix thereof and formed with a screw flight for displacing said viscous plastic mass toward said outlet; and at least one pocket formed in said inner wall and constituting a discontinuity in a rectilinear path of said mass between said mouth and said outlet and sweeping past said screw as said pocket is rotated on said funnel past said screw.

* * * * *